United States Patent Office 3,419,845
Patented Dec. 31, 1968

3,419,845
ECHO SOUNDING APPARATUS
Heinz A. E. Thiede, 28 J. Chr. Findorff-Strasse, 2804 Bremen-Lilienthal, Germany; Gunter F. W. Berkelmann, 55 Am Dobben, 28 Bremen, Germany; and Reinhard W. Leisterer, 9 Taubenstrasse, 2807 Achim, Bezirk Bremen, Germany
Filed June 1, 1967, Ser. No. 642,897
12 Claims. (Cl. 340—3)

ABSTRACT OF THE DISCLOSURE

The invention provides an apparatus for echo sounding, by which the angular locations of reflecting objects, relative to a vessel carrying the sounding apparatus, can be determined, this being accomplished by dividing the sounding transducer into strips which are connected to respective tappings on a compensation network which is so arranged that to each transducer strip a sounding signal is fed which differs in some predetermined characteristic from the sounding signals of adjacent strips, reflected signals received by the transducer strips being indicative of the said angular locations by virtue of their said predetermined characteristics.

Background of the invention

The invention relates to echo sounding apparatus with discrimination of reflecting objects in terms of their angular locations.

It has been proposed to provide echo sounding apparatus with discrimination of reflecting objects in terms of their angular locations, by providing means for transmitting sounding pulses which are distinguishably different from each other, in each of a plurality of directions defined by discrete angular regions of a sector-shaped field, a reception channel which is selective with regard to direction and with regard to the said characteristic being allocated to each of the said directions.

In the known apparatus of this kind, a separate transmitting and receiving section is provided for each one of the plurality of directions. Consequently, the apparatus is very expensive. Moreover, it has the disadvantage that in each direction the reverberation frequency coincides with transmitted frequency which is allocated to that direction and which is in the form of a sinusoidal signal, so that means cannot be provided for separating object echoes from reverberation echoes, insofar as there is no relative component present in the movement of the echo which produces a Doppler displacement.

In other previously proposed apparatus (U.K. Patent No. 866,972; Underwater-Acoustics 1962, published by Plenum Press Inc., pages 29–48; Journal of British I.R.E. 1959, pages 681–696 and Journal of British I.R.E. 1958, pages 465–484) especially for the fishing industry, it is known to achieve the allocation of direction to the indications of objects by radiating a sinusoidal impulse of constant frequency over a wide sector of for example ±10°, and at the receiving side displacing a sharply defined reception channel of for example 1° width, from the starboard side to the port side within the duration of one transmission pulse, this being effected by a combination of a delay chain, a multiply sub-divided reception transducer of high directivity and an arrangement for superimposing a frequency modulation.

This displacement of the reception channel is repeated in a periodic manner. The procedure has the disadvantage that it does not operate with preformed beams, that is to say the observation in any given direction is not continuous, but instead all of the sharply defined directions are sampled within a single transmission pulse period, this necessarily leading to an information loss.

Summary of the invention

The invention consists in an apparatus for echo sounding with discrimination of reflecting objects in terms of their angular locations, comprising means for transmitting sounding pulses at least some of which are of different frequencies or in different frequency bands or differing in some other characteristic, in each of a plurality of directions defined by discrete angular regions of a sector shaped field, a reception channel selective to the respective direction and frequency or other characteristic being allocated to each of the said directions, the said directions being established by a transducer divided into strips which serve for transmission and reception and are connected to tappings of a characteristic selective compensation network which for transmission is energised by a broad band transmission pulse, and which for reception is connected to reception channels which are allocated to the individually different characteristics and thus to the said directions, means being provided for successively sensing the channels to provide an output.

Preferably, the sensing means are arranged to interrogate the said channels and display the result, the information capacity of the said sensing means being greater than the total of the information flow of all of the channels.

Advantageously, the apparatus comprises a noise generator for providing the transmission pulses. Alternatively, a fixed frequency may be used for each individual direction, and the transmission pulse which is applied to the compensation network may consist of a superimposition of the different frequencies required.

It is particularly advantageous to use a frequency modulated signal as the transmission pulse signal. In this case, the electronic means by which reverberation influences are avoided, are particularly simple.

In order to make the invention clearly understood, reference will now be made to the accompanying drawings which are given by way of example and in which.

Figure 1:
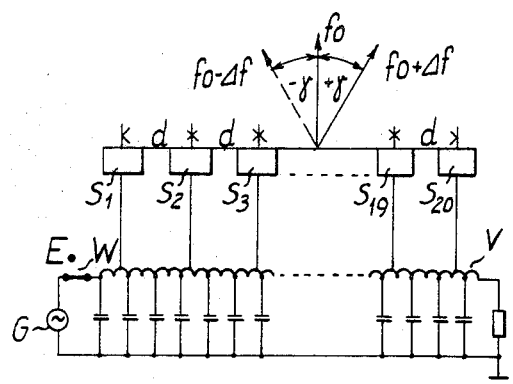
FIG. 1 is a simplified circuit diagram of the transmitting side of an echo sounding apparatus of the invention.

In the apparatus illustrated in FIG. 1, a transducer is provided which is divided into 20 strips $S_1$ to $S_{20}$, these being connected to a delay chain V of known construction. The strips $S_1$ to $S_{20}$ are spaced from each other by the distance $d$. The delay chain is so dimensioned that for a center frequency $f_o$, between each two successive tappings there is a phase displacement of $2\pi k$ ($k$=a whole number 0, 1, 2 . . .).

For transmission, a pulse generator G is connected to this chain, the generator being so arranged that for a time duration T a frequency band in the frequency range $f_o \pm \Delta f$ is applied to the input of the chain V. The center frequency $f_o$ amounts for example to 120 kc./s. and $\Delta f$ amounts to 10 kc./s. At the frequency $f_o$, the wavelength in water is $\lambda_o = c/f$. The radiation arrangement, as shown in FIG. 1, has the angle $\gamma$ relative to the normals to the strips $S_1$ to $S_{20}$. Between $\gamma$ and the individual magnitudes, the following relation exists:

$$\sin \gamma = \frac{k}{d/\lambda_o} \cdot \frac{f - f_o}{f}$$

In order to cover an angular range of ±10°, γ must be such that sin γ=±0.173. Suitable conditions exist if $k=1$ and $d/\lambda_0=\frac{1}{2}$.

With these constants, the sector from −10° to +10° is used in such a way that over each 1° section a frequency band of about 1 kc./s. is radiated, starting at the left hand side as viewed in FIG. 1 with a frequency band between 110 and 111 kc./s. and ending at the right hand side as viewed in FIG. 1 with a frequency band between 130 and 131 kc./s. The pulse length T should not be shorter than 1 ms. in order that at the receiving side, a frequency of 1 kc./s. such as is allocated to individual sectors of 1° width, is fully embraced.

Figure 2:
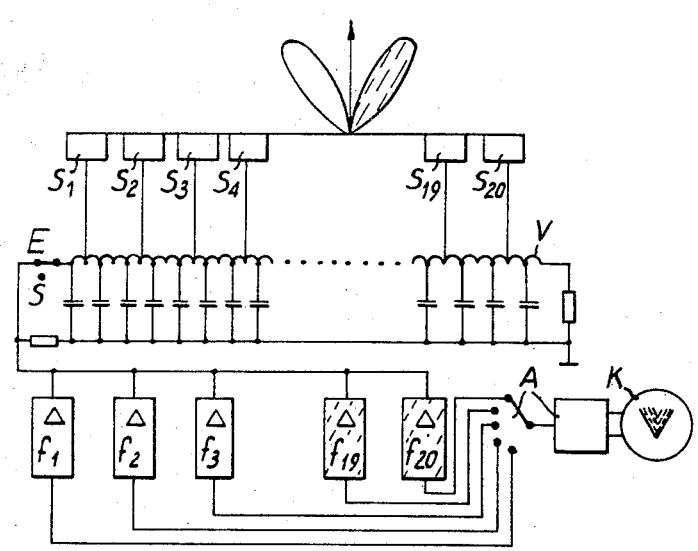
FIG. 2 is a simplified circuit diagram of the receiving side of an echo sounding apparatus of the invention.

The function of the arrangement during reception is illustrated in FIG. 2. Here, the strips $S_1$ to $S_{20}$ serve as reception transducers and, in the same way as during transmission, are connected to the delay chain V.

For reception, at the output of the delay chain V, after a transmit-receive switch W has been shifted from position S which represents transmission into position E which represents reception, a series of amplifiers $f_1$ to $f_{20}$ are provided which selectively filter out the frequency bands 110 to 111 kc./s., 111 to 112 kc./s. . . . 130 to 13 kc./s. The output voltages of these amplifiers are interrogated in known manner by a sensing device A and are displayed on a cathode ray tube K.

The manner of operation of the apparatus during transmission will be described with reference to FIG. 1. Here, a noise generator G serves as a transmission pulse generator and produces a frequency band of for example 110 to 131 kc./s. The delay chain is so arranged that between each two tappings, for the center frequency 120 kc./s. a delay of 1/120 ms. occurs, in other words for this frequency a phase displacement of $2\pi$ is achieved.

The frequencies of the noise band which are lower than 120 kc./s., for example 110 kc./s., experience the same time delay but a smaller phase displacement. Conversely, the higher frequencies, for example 130 kc./s., experience a larger phase displacement than $2\pi$. As a result of this, the frequencies in the 120 kc./s. region are radiated perpendicularly to the radiation face of the transducer base, those lying lower than this frequency are radiated with an increasing leftwards deviation and those lying higher than this frequency are radiated with an increasing rightward deviation.

With a spacing of the transducer of 0.5 $d/\lambda_0$, the apparatus operates in such a way that a radiation sector of about 1° is allocated to a frequency band of about 1 kc./s., commencing at the left hand side with 110 kc./s. and ending at the right hand side with a band ranging from 130 to 131 kc./s.

For reception, as will be seen from FIG. 2, for each direction represented by a sector of 1° width, an amplifier is used the band width of which amounts to 1 kc./s., commencing with the band 110 to 111 kc./s. and ranging up to a band extending between 130 and 131 kc./s. These amplifiers are connected to the tappings of the compensation chain in such a way that the reception lobe is correctly disposed for the allocated direction. By this means, a double action in respect of signal to disturbance conditions is achieved. Firstly, the frequency selection of 1 kc./s. band width already imposes a directional allocation, determined during transmission. Secondly, since the directional allocation is achieved by compensation conditions, the influence of signals from adjoining portions of the transmission sector, which would lead to disturbances, is avoided, since for example signals from a band ranging from 113 to 114 kc./s. are not received to any significant extent in adjoining bands ranging from 112 to 113 kc./s. and 114 to 115 kc./s. Any breakthrough to adjacent bands is small and becomes even smaller for remoter bands. Also, the use of a noise generator for providing the transmission signal has the advantage that reverberation disturbances can easily be avoided. Known procedures in which signals of differing frequency are transmitted in a plurality of directions, operate with sinusoidal sound pulses which cause complication in exclusion of echo effects from static objects as they produce interference effects which originate in zones excited by the sound. These interference effects do not occur when noise pulses are used. The same is true for frequency modulated pulses and broad band pulses with a pseudo-statistic characteristic.

The information loss which occurs when the entire angular region is sensed within the pulse duration can be avoided by continuously receiving the echo information in the individual amplifier channels. The band width of the individual amplifiers is smaller by a factor equal to their number than the band width in known arrangements. Accordingly, an improvement is obtained in the signal-to-disturbance ratio, which acts favourably on the information loss. It is necessary however that the means which are used for sensing the individual amplifiers has a greater information capacity than the information flow of all of the channels together.

Figure 3:
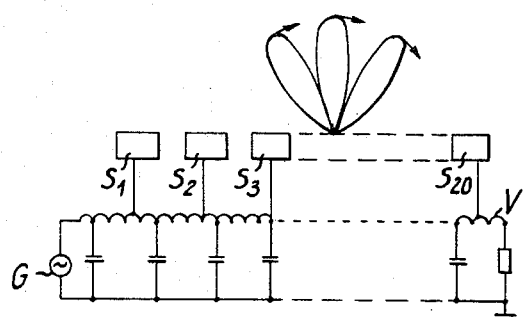
FIG. 3 is a circuit diagram illustrating a modification of FIG. 1.

In the modification shown in FIG. 3, instead of a single directional beam during transmission, a beam which is split into three differently directed portions is used. This has the advantage that the beam is swung over only a small angular range, thus requiring a shorter time, this being important when using a freqeuncy modulated signal.

Figure 4:
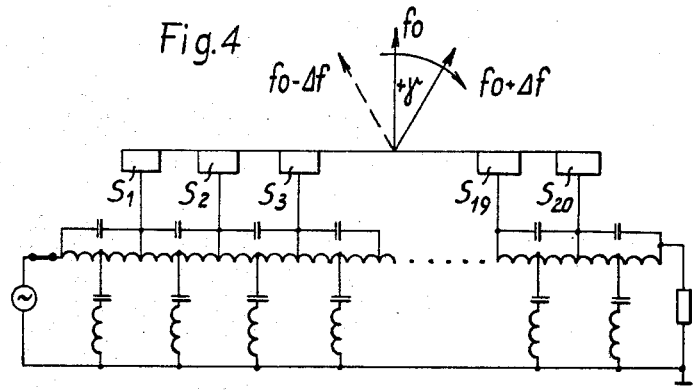
FIG. 4 is a circuit diagram illustrating another modification of FIG. 1.

In the modification shown in FIG. 4, the compensation network, instead of being formed by a delay chain of first order, is formed by an all-pass network of higher order. This has the advantage that the distribution of the directions is symmetrical with regard to the center frequency.

Modifications are possible. For example, for individual directions within the transmission sector, different ways of characterising within the transmission sector, different ways of characterising the transmitted signal may be used, the limits of the overall frequency band being the same for each characterisation, for example characterisation by pseudo-statistic pulse sequences.

We claim:
1. An apparatus for echo sounding with discrimination of reflecting objects in terms of their angular locations, comprising means for transmitting sounding pulses at least some of which are of different frequencies in each of a plurality of directions defined by discrete angular regions of a sector-shaped field, a reception channel selective to the respective direction and freqeuncy being allocated to each of the said directions, means for establishing the said directions comprising a transducer divided into strips which serve for transmission and reception, a characteristic selective compensation network which for transmission is energised by a broad band transmission pulse and which for reception is connected to reception channels which are allocated to the individually different characteristics and thus to the said directions and having tappings coupled to respective ones of said strips with the phase displacement between successive tappings being $2\pi k$ at a predetermined center frequency of the band including said different frequencies with $k$ being an integer, said means for transmitting including a source of a broad band transmission pulse having spectral components including said different frequencies, said reception channels, and means for successively sensing the reception channels to provide an output.

2. An echo sounding apparatus as claimed in claim 1, wherein the sensing means are arranged to interrogate the said channels and display the result, the information capacity of the said sensing means being greater than the total of the information flow of all of the channels.

3. An echo sounding apparatus as claimed in claim 1, comprising a noise generator for providing the transmission pulses.

4. An echo sounding apparatus as claimed in claim 1, so arranged that for transmission a respective fixed frequency is allocated to each said direction and the transmission pulses applied to the compensation network represent a superimposition of all of the said fixed frequencies.

5. An echo sounding apparatus as claimed in claim 1, comprising a frequency modulated signal generator for providing the transmission pulses.

6. An echo sounding apparatus as claimed in claim 1, wherein for each direction a compensation network used during transmission is provided, to which respective signals having different characteristics but lying in the same frequency band are applied.

7. An echo sounding apparatus as claimed in claim 1, so arranged that the sounding pulses transmitted in a plurality of the said directions not lying adjacent one another in the said sector-shaped field, have the same frequency characteristic.

8. An echo sounding apparatus as claimed in claim 1, wherein the compensating network is a delay chain and all pass network.

9. Apparatus for directional echo sounding within a predetermined angular sector comprising,
- an elongated group of underwater sound transducing elements,
- a delay line system having respective taps connected to respective ones of said sound transducing elements,
- echo sounding pulse generating means for producing differently coded energizing signals characterized by different pseudo-statistic pulse sequences,
- means for coupling the latter differently coded energizing signals to said sound transducing elements, said means including said delay line, for changing direction of radiation with change of code characterization,
- electrical receiving means,
- and means for coupling said eletcrical receiver means to said delay line alternately with said echo sounding pulse generating means,
- said receiver means including means responsive to echo signals reflected from an object located within said predetermined angular sector and received at said transducing elements,
- the code of said echo signals being representative of the angular position of said object relative to said group of transducers in said angular sector.

10. Apparatus in accordance with claim 9 wherein said echo sounding pulse generating means includes a noise generator.

11. Apparatus in accordance with claim 9 wherein said echo sounding pulse generating means includes means for furnishing separated frequences for each of the separated directions within said predetermined angular sector.

12. Apparatus in accordance with claim 1 wherein said echo sounding pulse generating means includes means for providing frequency modulating signals.

References Cited

UNITED STATES PATENTS

| | | | |
|---|---|---|---|
| 2,404,391 | 7/1946 | Mason | 340—10 |
| 2,407,169 | 9/1946 | Loughren. | |
| 2,408,435 | 10/1946 | Mason. | |
| 2,810,905 | 10/1957 | Barlow | 343—100 |
| 3,119,998 | 1/1964 | Foley | 343—16 |
| 3,121,856 | 2/1964 | Finney | 340—3 |

RICHARD A. FARLEY, *Primary Examiner.*

U.S. Cl. X.R.

340—6; 343—16